(12) United States Patent
Nielsen et al.

(10) Patent No.: US 10,970,040 B2
(45) Date of Patent: Apr. 6, 2021

(54) SYSTEMS AND METHODS FOR AUGMENTED REALITY CONTENT HARVESTING AND INFORMATION EXTRACTION

(71) Applicant: Bose Corporation, Framingham, MA (US)

(72) Inventors: Elizabeth Nielsen, Allston, MA (US); Elio Dante Querze, Arlington, MA (US); Marko Orescanin, Salinas, CA (US); Naganagouda B. Patil, Ashland, MA (US); Marina Shah, Seattle, WA (US); Vijayan P. Sarathy, Littleton, MA (US); Shanthi Chandrababu, Shrewsbury, MA (US); Shuo Zhang, Cambridge, MA (US); Isaac Julien, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 109 days.

(21) Appl. No.: 16/290,560

(22) Filed: Mar. 1, 2019

(65) Prior Publication Data
US 2020/0278831 A1    Sep. 3, 2020

(51) Int. Cl.
*G06F 3/16*    (2006.01)
*G10L 15/197*    (2013.01)

(52) U.S. Cl.
CPC .......... *G06F 3/167* (2013.01); *G10L 15/197* (2013.01)

(58) Field of Classification Search
CPC .............................. G06F 3/167; G10L 15/197
(Continued)

(56) References Cited

U.S. PATENT DOCUMENTS

| | | |
|---|---|---|
| 9,426,411 B2 | 8/2016 | Jung |
| 10,194,259 B1 | 1/2019 | Martin et al. |

(Continued)

FOREIGN PATENT DOCUMENTS

| | | |
|---|---|---|
| AU | 2019200732 A1 | 2/2019 |
| EP | 2690407 A1 | 1/2014 |
| WO | 2004105035 A1 | 12/2004 |

OTHER PUBLICATIONS

Radev, D.R., Jing, H., Stys, M., and Tam, D. (2004). Centroid-based summarization of multiple documents. Information Processing and Management 40 (2004), 40:919-938.
(Continued)

*Primary Examiner* — Leonard Saint Cyr
(74) *Attorney, Agent, or Firm* — Bond, Schoeneck & King, PLLC

(57) ABSTRACT

The present disclosure is directed to systems and methods for the creation of a localized audio message for use in a personal audio device. The system includes: a database of information relating to a pre-determined subject obtained from online media content; one or more processors; and a personal audio device configured to receive a localized audio message. The processors extract a dataset comprising information relating to a pre-determined subject from online media content; generate one or more summaries of the information relating to the pre-determined subject; generate a localized audio message based on the one or more summaries; and send the localized audio message to a personal audio device of a user.

21 Claims, 4 Drawing Sheets

(58) Field of Classification Search
USPC .............. 704/246, 247, 251, 252, 270–271
See application file for complete search history.

(56) References Cited

U.S. PATENT DOCUMENTS

| | | | |
|---|---|---|---|
| 10,614,831 B2* | 4/2020 | Jarvis .................. | G10L 25/51 |
| 2010/0145694 A1* | 6/2010 | Ju ....................... | G10L 15/22 |
| | | | 704/235 |
| 2011/0161085 A1* | 6/2011 | Boda .................. | G06Q 30/02 |
| | | | 704/260 |
| 2014/0277639 A1 | 9/2014 | Gomes-Casseres et al. | |
| 2014/0277644 A1 | 9/2014 | Gomes-Casseres et al. | |
| 2015/0369624 A1* | 12/2015 | Cavanaugh ........ | G01C 21/3626 |
| | | | 701/522 |
| 2017/0098466 A1 | 4/2017 | Elliot et al. | |
| 2018/0336904 A1 | 11/2018 | Piercy et al. | |
| 2019/0019322 A1 | 1/2019 | Sankaran et al. | |
| 2019/0115045 A1* | 4/2019 | Jarvis .................. | G10L 25/51 |
| 2019/0246235 A1* | 8/2019 | Bruser ................ | G06F 3/017 |

OTHER PUBLICATIONS

PyTeaser; 2017; Website available at: https://github.com/xiaoxu193/PyTeaser.

International Search Report and the Written Opinion of the International Searching Authority, International Application No. PCT/US2020/020040, pp. 1-12, dated May 8, 2020.

* cited by examiner

SYSTEMS AND METHODS FOR AUGMENTED REALITY CONTENT HARVESTING AND INFORMATION EXTRACTION

BACKGROUND

This disclosure relates to systems and methods for creating localized audio messages.

SUMMARY OF THE INVENTION

The present disclosure is directed to systems and methods for creating localized audio messages for use with a personal audio device, in particular, systems and methods that use content from online media sources to create localized audio messages.

Generally, in one aspect, a system for creating a localized audio message is provided. The system for creating localized audio message includes: (i) a database comprising information relating to a pre-determined subject obtained from online media content; (ii) one or more processors; (iii) a personal audio device configured to receive an audio message based on the trigger location of a user. The one or more processors are configured to: extract a dataset comprising information relating to a pre-determined subject from online media content; generate one or more summaries of the information relating to the pre-determined subject; generate a localized audio message based on the one or more summaries; and send the localized audio message to a personal audio device of a user, wherein the audio message is sent based on one or more triggering factors.

In an aspect, the system is further configured such that the triggering factors include: time, location of the personal audio device or user, geographic type, weather, demographic information, speed, pin-to-pin conditionality, social media connections, proximity to other user devices, celestial events, newly available media and news, previous usage of localized audio messages, use of noise cancellation control, peer-to peer communication, or usage patterns.

In an aspect, the system is further configured such that a geographic location of the user is determined from sensor data of a sensor system associated with the personal audio device.

In an aspect, the system is further configured such that the sensor system associated with the personal audio device comprises: a position tracking system, a global positioning system, an orientation tracking system, an accelerometer, magnetometer, or a gyroscope.

In an aspect, the system is further configured such that the localized audio message is generated using summaries that are selected based on information that is contextual to the user.

In an aspect, the system is further configured such that information relating to a pre-determined subject is summarized using at least one of: extractive summarization and abstractive summarization.

In an aspect, the system is further configured such that the localized audio message is generated using natural language processing.

In an aspect, the system is further configured such that the localized audio message is generated by converting the one or more summaries relating to a pre-determined subject into a pre-determined template language structure.

In an aspect, the system is further configured such that the localized audio message is generated using probabilistic context-free grammars.

In an aspect, the system is further configured such that the information relating to a pre-determined subject from online media content is selected from pre-determined online media sources.

In an aspect, the system is further configured such that the information relating to a pre-determined subject from online media content is generated by one or more online media users.

Generally, in one aspect, a computer-implemented method for creating a localized audio message is provided. The method includes: extracting a dataset comprising information relating to a pre-determined subject from online media content; generating one or more summaries based on the information relating to a pre-determined subject; generating a localized audio message based on the one or more summaries; and sending the localized audio message to a personal audio device of a user, wherein the audio message is sent based on one or more triggering factors.

In an aspect, the triggering factors include: time, location of the personal audio device or user, geographic type, weather, demographic information, speed, pin-to-pin conditionality, social media connections, proximity to other user devices, celestial events, newly available media and news, previous usage of localized audio messages, use of noise cancellation control, peer-to peer communication, or usage patterns.

In an aspect, the method further includes the step of determining a geographic location of the personal audio device from sensor data of a sensor system associated with the personal audio device.

In an aspect, the method allows for the sensor system associated with the personal audio device to comprise: a position tracking system, a global positioning system, an orientation tracking system, an accelerometer, magnetometer, or a gyroscope.

In an aspect, the method allows for the localized audio message to be generated using summaries that are selected based on information that is contextual to the user.

In an aspect, the method allows for information relating to a pre-determined subject to be summarized using at least one of: extractive summarization and abstractive summarization.

In an aspect, the method allows for the localized audio message to be generated using natural language processing.

In an aspect, the method further includes the step of generating an introduction to the localized audio message which is personalized to the user.

In an aspect, the method allows for the localized audio message to be generated by converting the one or more summaries relating to a pre-determined subject into a pre-determined template language structure.

In an aspect, the method allows for the localized audio message to be generated using probabilistic context-free grammars.

In an aspect, the method allows for the information relating to a pre-determined subject from online media content to be selected from pre-determined online media sources.

In an aspect, the method allows for that the information relating to a pre-determined subject from online media content to be generated by one or more online media users.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION OF EMBODIMENTS

The present disclosure is directed to systems and methods for creating localized audio messages for use with a personal audio device, in particular, systems and methods that use content from online media sources to create localized audio messages.

Applicant has appreciably recognized that by using natural language processing (NLP) techniques, including extractive summarization, the systems and methods disclosed herein can be used to transform text content from online media sources (e.g. webpages, mobile applications, etc.) into useful audio snippets. The systems and methods disclosed herein may advantageously allow for presentation of audio content to users of personal audio devices without the need to create complicated systems and tools. As one example, extractive summarization can be used to select parts of restaurant reviews to present to a user as an audio snippet. The text of the snippet is extracted from preexisting content such as online media sources. Extractive summarization may be used to extract content that is most salient to create a summary entirely from preexisting content.

Figure 1:
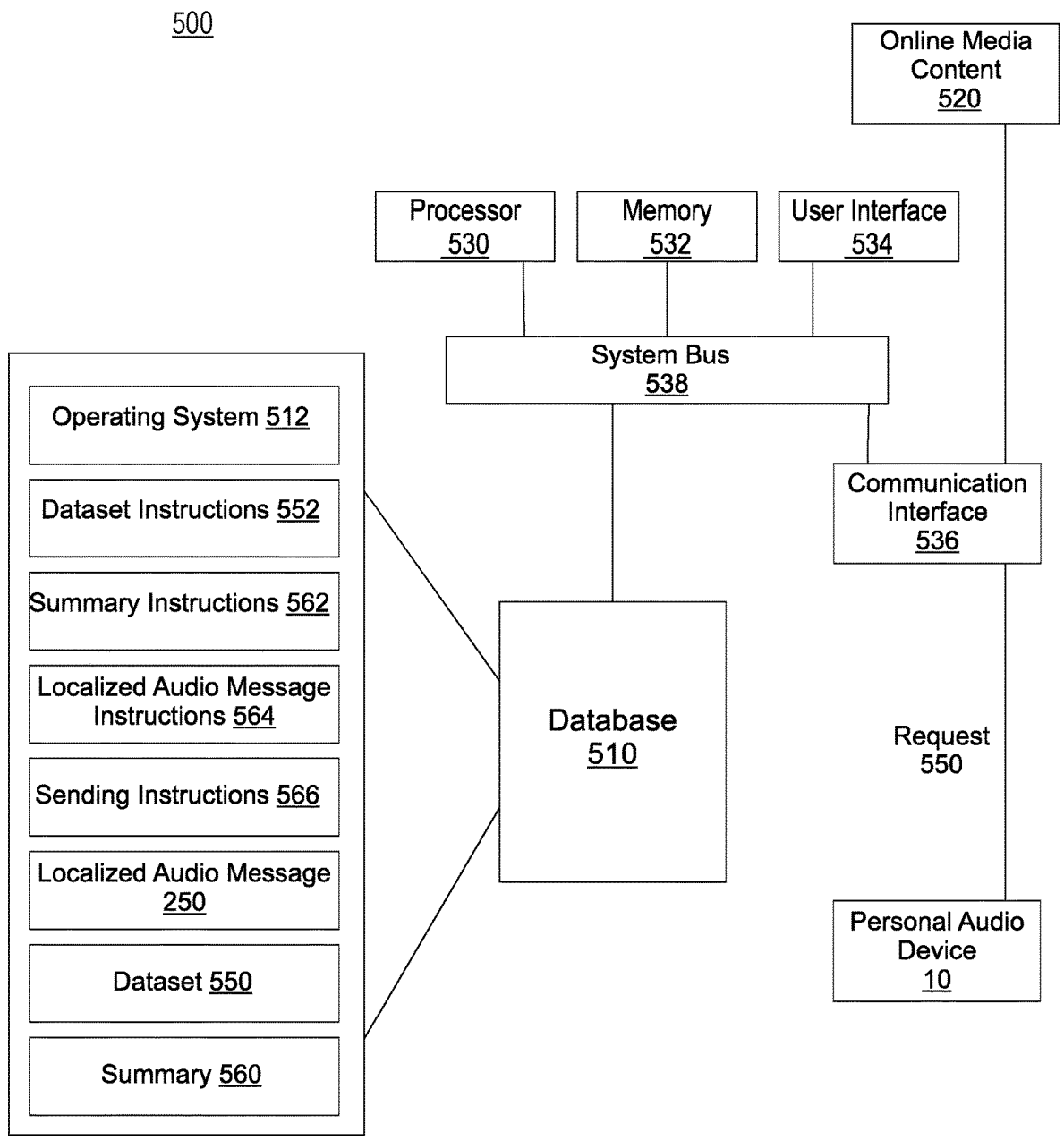
FIG. 1 is a schematic illustration of an exemplary system for creating a localized audio message.

FIG. 1 shows a schematic representation of one exemplary system 500 for creating a localized audio message. System 500 may be any of the systems described or otherwise envisioned herein, and may comprise any of the components described or otherwise envisioned herein. System 500 comprises one or more of a processor 530, memory 532, user interface 534, communications interface 536, and storage 510, interconnected via one or more system buses 538. It will be understood that FIG. 1 constitutes, in some respects, an abstraction and that the actual organization of the components of the system 500 may be different and more complex than illustrated.

Figure 4:
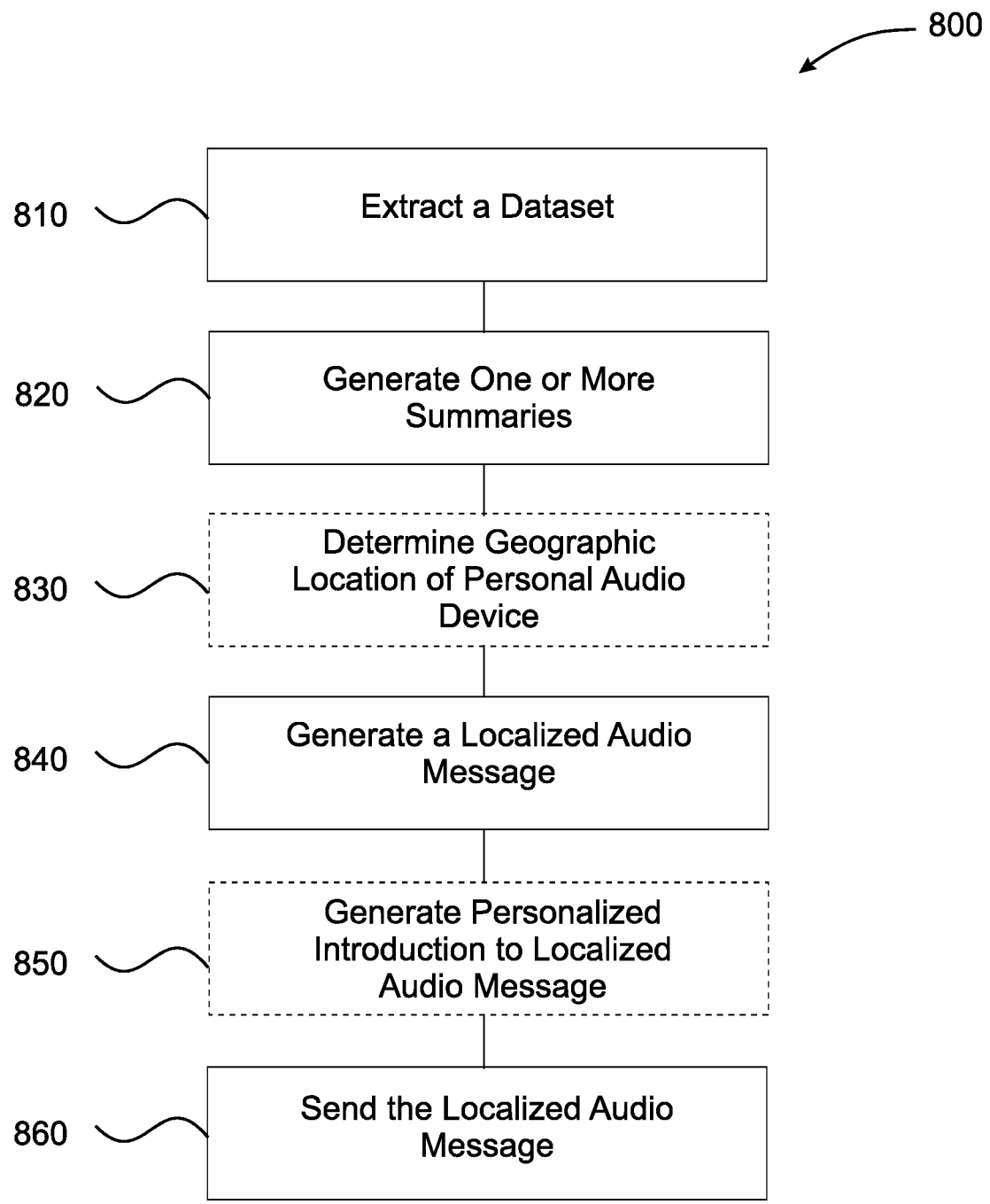
FIG. 4 is flowchart showing an exemplary method for creating a localized audio message according to aspects of the present disclosure.

According to an example, system 500 comprises a processor 530 capable of executing instructions stored in memory 532 or storage 510 or otherwise processing data to, for example, perform one or more steps of the method for creating a localized audio message (as shown in FIG. 4). Processor 530 may be formed of one or multiple modules. Processor 530 may take any suitable form, including but not limited to a microprocessor, microcontroller, multiple microcontrollers, circuitry, field programmable gate array (FPGA), application-specific integrated circuit (ASIC), a single processor, or plural processors.

The processor 530 can receive a request 540 for a localized audio message 250 relating to a pre-determined subject. The processor 530 extracts a dataset 550 comprising information relating to a pre-determined subject from online media content 520. The processor 530 then generates one or more summaries 560 of the information relating to the pre-determined subject and stores one or more summaries 560 in a database 510. The processor 530 then generates a localized audio message 250 based on the one or more summaries 560. The processor 530 then sends the localized audio message 250 to a personal audio device 10.

Memory 532 can take any suitable form, including a non-volatile memory and/or random-access memory (RAM). The memory 532 may include various memories such as, for example L1, L2, or L3 cache or system memory. As such, the memory 532 may include static random access memory (SRAM), dynamic RAM (DRAM), flash memory, read only memory (ROM), or other similar memory devices. The memory can store, among other things, an operating system. The RAM is used by the processor for the temporary storage of data. According to an example, an operating system 512 may contain code which, when executed by the processor, controls operation of one or more components of system 500. It will be apparent that, in implementations where the processor 530 implements one or more of the functions described herein in hardware, the software described as corresponding to such functionality in other implementations may be omitted.

User interface 534 may include one or more devices for enabling communication with a user. The user interface can be any device or system that allows information to be conveyed and/or received, and may include a display, a mouse, and/or a keyboard for receiving user commands. In some implementations, user interface 534 may include a command line interface or graphical user interface that may be presented to a remote terminal via communication interface 536. The user interface may be located with one or more other components of the system, or may located remote from the system and in communication via a wired and/or wireless communications network.

Communication interface 536 may include one or more devices for enabling communication with other hardware devices. For example, communication interface 536 may include a network interface card (NIC) configured to communicate according to the Ethernet protocol. Additionally, communication interface 536 may implement a TCP/IP stack for communication according to the TCP/IP protocols. Communication interface 536 may also include a wireless communication module for establishing a wireless connection with other hardware devices, e.g., via Bluetooth, Bluetooth Low Energy, ZigBee, Wi-Fi (IEEE 802.11) or any other protocol for establishing a wireless connection. Various alternative or additional hardware or configurations for communication interface 536 will be apparent.

Database or storage 510 may include one or more machine-readable storage media such as read-only memory (ROM), random-access memory (RAM), magnetic disk storage media, optical storage media, flash-memory devices, or similar storage media. In various implementations, database 510 may store instructions for execution by processor 530 or data upon which processor 530 may operate. For example, database 510 may store an operating system 512 for controlling various operations of system 500. Database 510 may also store a dataset 550 comprising information relating to a pre-determined subject from online media content.

It will be apparent that various information described as stored in database 510 may be additionally or alternatively stored in memory 532. In this respect, memory 532 may also be considered to constitute a storage device and database 510 may be considered a memory. Various other arrangements will be apparent. Further, memory 532 and database 510 may both be considered to be non-transitory machine-readable media. As used herein, the term non-transitory will be understood to exclude transitory signals but to include all forms of storage, including both volatile and non-volatile memories.

While the system 500 for creating a localized audio message 250 is shown as including one of each described component, the various components may be duplicated or combined in various implementations. For example, processor 530 may include multiple microprocessors that are configured to independently execute the methods described herein or are configured to perform steps or subroutines of the methods described herein such that the multiple processors cooperate to achieve the functionality described herein. Further, where one or more components of system 500 is implemented in a cloud computing system, the various hardware components may belong to separate physical systems. For example, processor 530 may include a first processor in a first server and a second processor in a second server. Many other variations and configurations are possible.

The system 500 for creating a localized audio message 250 may store or comprise one or more algorithms, engines, and/or instructions to carry out one or more functions or steps of the methods described or otherwise envisioned herein. For example, database 510 may store a dataset 550 comprising information relating to a pre-determined subject from online media content, one or more summaries 560 of the information relating to the pre-determined subject, and a localized audio message 250 based on the one or more summaries. The system may comprise, among other instructions, dataset preparation instructions 552, summary preparation instructions 562, localized audio message preparation instructions 564, and/or sending instructions 566. The system may store additional software components required to execute the functionality described herein, which also may control operations of hardware 500.

Aspects and implementations disclosed herein may be applicable to a wide variety of personal audio devices 10, such as a portable speaker, headphones, and wearable audio devices in various form factors, such as watches, glasses, neck-worn speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some particular aspects disclosed may be particularly applicable to personal (wearable) audio devices such as glasses or other head-mounted audio devices. It should be noted that although specific implementations of personal audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

Figure 2:
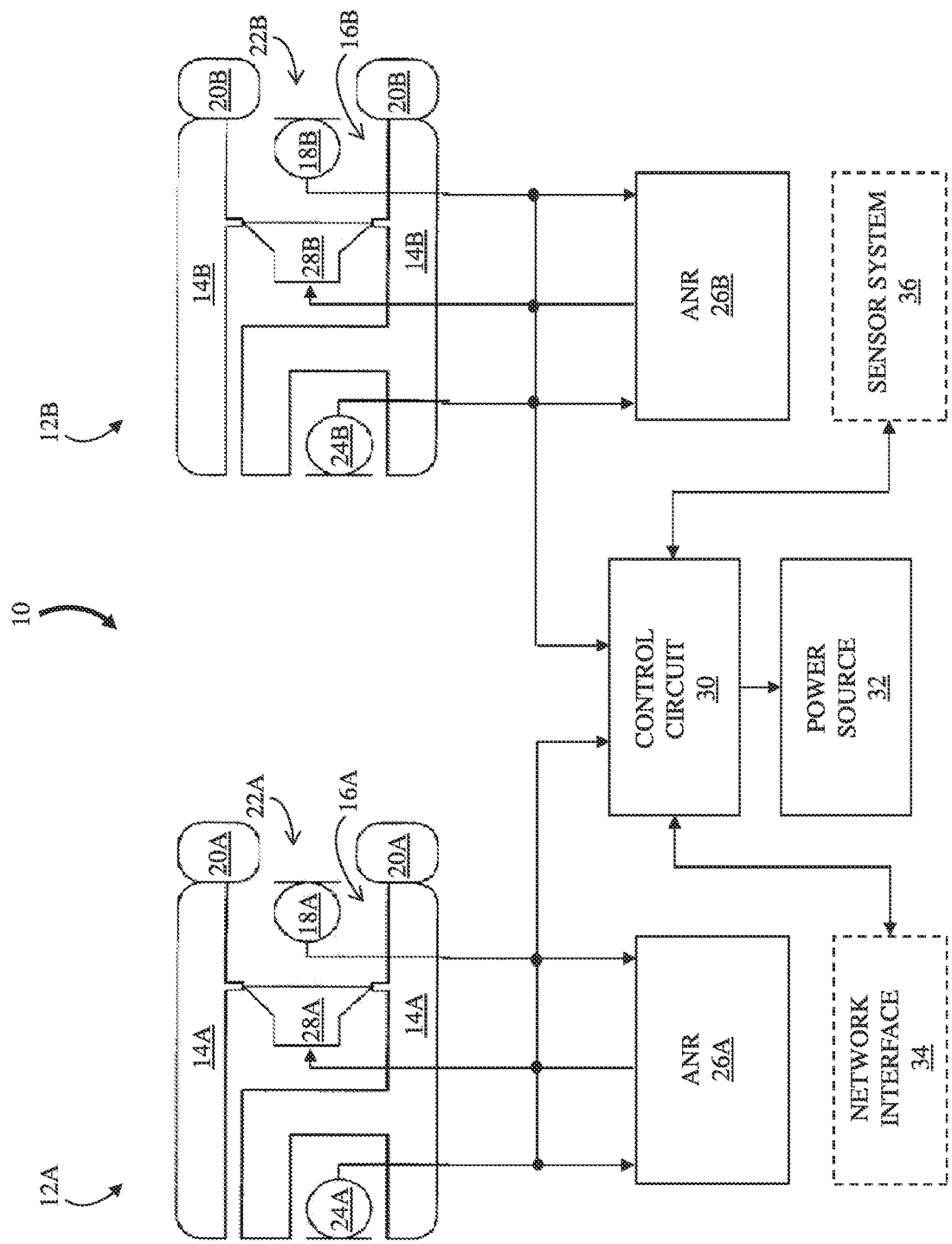
FIG. 2 is a block diagram depicting an example personal audio device according to various disclosed implementations.

FIG. 2 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. In implementations where personal audio device 10 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR, the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24 and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP), and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a user (e.g., wearer) may be provided or altered, and a device in communication with the personal audio device may be controlled. The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein (e.g., Bluetooth, Bluetooth Low Energy, Zig-Bee, Wi-Fi (IEEE 802.11) or any other protocol for establishing a wireless connection). In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In addition to a processor and/or microcontroller, control circuit 30 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling directional audio selection functions according to various particular implementations. It is understood that portions of the control circuit 30 (e.g., instructions) could also be stored in a remote location or in a distributed location, and could be fetched or otherwise obtained by the control circuit 30 (e.g., via any communications protocol described herein) for execution. The instructions may include instructions for controlling directional audio selection-based processes (i.e., the software modules include logic for processing inputs from a user and/or sensor system to manage audio streams), as well as digital signal processing and equalization. Additional details may be found in U.S. Patent Application Publication 20140277644, U.S. Patent Application Publication 20170098466, and U.S. Patent Application Publication 20140277639, the disclosures of which are incorporated herein by reference in their entirety.

Personal audio device 10 can also include a sensor system 36 coupled with control circuit 30 for detecting one or more conditions of the environment proximate personal audio device 10. Sensor system 36 can include inner microphones 18 and/or outer microphones 24, sensors for detecting inertial conditions at the personal audio device and/or conditions of the environment proximate personal audio device 10 as described herein. The sensors may be on-board the personal audio device 10, or may be remote or otherwise wireless (or hard-wired) connected to the personal audio device 10. As described further herein, sensor system 36 can include a plurality of distinct sensor types for detecting inertial information, environmental information, or commands at the personal audio device 10. In particular implementations, sensor system 36 can enable detection of user movement, user orientation, and/or look direction of the user's head, including movement of a user's head or other body part(s). In particular, portions of sensor system 36 may incorporate one or more movement sensors, such as accelerometers, gyroscopes and/or magnetometers. In some particular implementations, sensor system 36 can include a single IMU having three-dimensional (3D) accelerometers, gyroscopes and a magnetometer.

In various implementations, the sensor system 36 can be located at the personal audio device 10, e.g., where an IMU is physically housed in the personal audio device 10. In some examples, the sensor system 36 (e.g., including the IMU) is configured to detect a position, or a change in position, of the personal audio device 10. This inertial information can be used to control various functions described herein. For example, the inertial information can be used to trigger a command function, such as activating an operating mode of the personal audio device 10 (e.g., a spatial audio mode), modify playback of an audio sample in the spatial audio mode, or initiate playback of audio content associated with one or more samples.

The sensor system 36 can also include one or more interface(s) for receiving commands at the personal audio device 10. For example, sensor system 36 can include an interface permitting a user to initiate functions of the personal audio device 10. In a particular example implementation, the sensor system 36 can include, or be coupled with, a capacitive touch interface for receiving tactile commands on the personal audio device 10.

In other implementations, as illustrated in the phantom depiction in FIG. 2, one or more portions of the sensor system 36 can be located at another device capable of indicating inertial information about the user of the personal audio device 10. For example, in some cases, the sensor system 36 can include an IMU physically housed in a hand-held device such as a pointer, or in another wearable audio device. In particular example implementations, at least one of the sensors in the sensor system 36 can be housed in a wearable audio device distinct from the personal audio device 10, such as where personal audio device 10 includes headphones and an IMU is located in a pair of glasses, a watch or other wearable electronic device.

According to various implementations, the audio playback devices (which may be, for example, personal audio device 10 of FIG. 2) described herein can be configured to operate in a spatial audio mode according to one or more factors. These particular implementations can allow a user to select between a plurality of choices conveyed to a user via audio, for example a plurality of audio playback sources, using directional commands detectable at the personal audio device 10, or another device connected with the personal audio device 10. In some cases, these implementations allow a user to sample a plurality of audio content sources and select audio content source(s) for playback using inertial commands. These inertial commands can be executed at the personal audio device 10 (or another connected device), and can permit control of audio playback without the need to interface with an audio gateway device (e.g., a mobile phone, personal computer (PC), e.g., tablet), or provide voice commands to a control device. These implementations can enhance the user experience in comparison to conventional audio systems, e.g., audio systems requiring commands at an audio gateway interface or voice commands at a control device.

Figure 3:
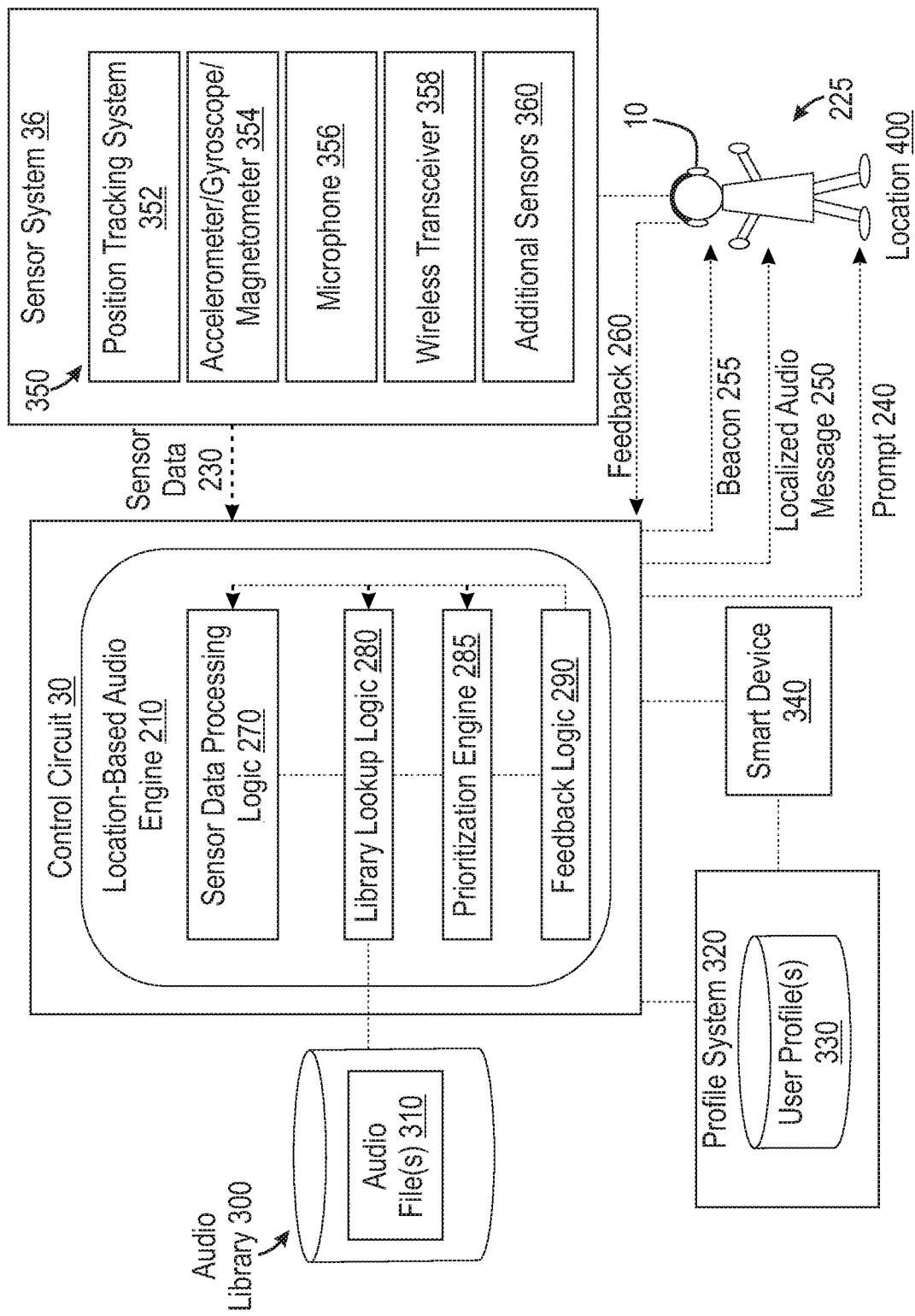
FIG. 3 is a schematic data flow diagram illustrating control processes performed by the personal audio device of FIG. 2.

As described with respect to FIG. 2, control circuit 30 can execute (and in some cases store) instructions for controlling directional audio selection in personal audio device 10 and/or other audio playback devices in a network of such devices. As shown in FIG. 3, control circuit 30 can include a location-based audio engine 210 configured to implement modifications in audio outputs at the transducer (e.g., speaker) 28 (FIG. 2) in response to a change in location-based or other conditions. In various particular implementations, location-based audio engine 210 is configured to receive data about an environmental condition from sensor system 36, and modify the audio output at transducer(s) 28 in response to a change in the environmental condition. In particular implementations, the audio output includes a localized audio message 250 provided at a specific geographic location, or proximate a specific geographic location, which is configured to vary with the change(s) in location and/or environmental condition. In certain cases, the localized audio message 250 can only be provided to the user at or proximate the geographic location, providing an immersive experience at that location. In other cases, the localized audio message 250 is provided to the user based on triggering factors, which can include environmental factors, information regarding how the personal audio device 10 is being used, demographic information about the user, past usage information from the user, etc. The location based audio engine 210 and the prioritization engine 285 can assess triggering factors to determine when and if a localized audio message 250 is provided to a user 225 or requested from the system for creating a localized audio message 500 (as illustrated in FIG. 1).

According to various implementations, control circuit 30 includes the location based audio engine 210, or otherwise accesses program code for executing processes performed by location-based audio engine 210 (e.g., via network interface 34). Location based audio engine 210 can include logic for processing sensor data 230 (e.g., receiving data indicating proximity of personal audio device 10 to a geographic location) from sensor system 36, and providing a prompt 240 to the user 225 to initiate playback of a localized audio message 250 to the user 225 at the personal audio device 10. In various implementations, in response to actuation (e.g., feedback 260) of the prompt 240 by the user 225, the location-based audio engine 210 initiates playback of the localized audio message 250 at the personal audio device 10. In additional implementations, location-based audio engine 210 can provide a beacon 255 to user 225 to indicate a direction of a localized audio message 250 based upon the sensor data 230. In some cases, this logic can include sensor data processing logic 270, library lookup logic 280 and feedback logic 290.

Location-based audio engine 210 can be coupled (e.g., wirelessly and/or via hardwired connections in personal audio device 10) with an audio library 300, which can include audio files 310 for playback (e.g., streaming) at personal audio device 10 and/or a profile system 320 including user profiles 330 about one or more user(s) 225. Audio library 300 can include any library associated with digital audio sources accessible via network interface 34 (FIG. 2) described herein, including locally stored, remotely stored or Internet-based audio libraries. Audio files 310 can additionally include audio pins or caches created by other users, and made accessible according to various functions described herein. User profiles 330 may be user-specific, community-specific, device-specific, location-specific or otherwise associated with a particular entity such as user 225. User profiles 330 can include user-defined playlists of digital music files, audio messages stored by the user 225 or another user, or other audio files available from network audio sources coupled with network interface 34 (FIG. 2), such as network attached storage (NAS) devices, and/or a DLNA server, which may be accessible to the personal audio device 10 (FIG. 2) over a local area network such as a wireless (e.g., Wi-Fi) or wired (e.g., Ethernet) home network, as well as Internet music services such as Pandora®, vTuner®, Spotify®, etc., which are accessible to the audio personal audio device 10 over a wide area network such as the Internet. In some cases, profile system 320 is located in a local server or a cloud-based server, similar to any such server described herein. User profile 330 may include information about frequently played audio files associated with user 225 or other similar users (e.g., those with common audio file listening histories, demographic traits or Internet browsing histories), "liked" or otherwise favored audio files associated with user 225 or other similar users, frequency with which particular audio files are changed by user 225 or other similar users, etc.

Profile system 320 can be associated with any community of users, e.g., a social network, subscription-based music service (such as a service providing audio library 300), and may include audio preferences, histories, etc. for user 225 as well as a plurality of other users. In particular implementations, profile system 320 can include user-specific preferences (as profiles 330) for audio messages and/or related notifications (e.g., beacons or beckoning messages). Profiles 330 can be customized according to particular user preferences, or can be shared by users with common attributes.

Location-based audio engine 210 can also be coupled with a smart device 340 that has access to a user profile (e.g., profile 330) or biometric information about user 225. It is understood that smart device 340 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 340 can include a conventional user interface for permitting interaction with user 225, and can include one or more network interfaces for interacting with control circuit 30 and other components in personal audio device 10 (FIG. 2). In some example implementations, smart device 340 can be utilized for: connecting personal audio device 10 to a Wi-Fi network; creating a system account for the user 225; setting up music and/or location-based audio services; browsing of content for playback; setting preset assignments on the personal audio device 10 or other audio playback devices; transport control (e.g., play/pause, fast forward/rewind, etc.) for the personal audio device 10; and selecting one or more personal audio devices 10 for content playback (e.g., single room playback or synchronized multi-room playback). In some cases smart device 340 may also be used for: music services setup; browsing of content; setting preset assignments on the audio playback devices; transport control of the audio playback devices; and selecting personal audio devices 10 (or other playback devices) for content playback. Smart device 340 can further include embedded sensors for measuring biometric information about user 225, e.g., travel, sleep or exercise patterns; body temperature; heart rate; or pace of gait (e.g., via accelerometer(s)).

As shown in FIG. 3, sensor system 36 can include one or more of the following sensors 350: a position tracking system 352; an accelerometer/gyroscope/magnetometer 354; a microphone (e.g., including one or more microphones) 356 (which may include or work in concert with microphones 18 and/or 24); and a wireless transceiver 358. These sensors are merely examples of sensor types that may be employed according to various implementations. It is further understood that sensor system 36 can deploy these sensors in distinct locations and distinct sub-components in order to detect particular environmental information relevant to user 225.

The position tracking system 352 can include one or more location-based detection systems such as a global positioning system (GPS) location system, a Wi-Fi location system, an infra-red (IR) location system, a Bluetooth beacon system, etc. In various additional implementations, the position tracking system 352 can include an orientation tracking system for tracking the orientation of the user 225 and/or the personal audio device 10. The orientation tracking system can include a head-tracking or body-tracking system (e.g., an optical-based tracking system, accelerometer, magnetometer, gyroscope, magnetometer, or radar) for detecting a direction in which the user 225 is facing, as well as movement of the user 225 and the personal audio device 10. Position tracking system 352 can be configured to detect changes in the physical location of the personal audio device 10 and/or user 225 (where user 225 is separated from personal audio device 10) and provide updated sensor data 230 to the location-based audio engine 210 in order to indicate a change in the location of user 225. Position tracking system 352 can also be configured to detect the orientation of the user 225, e.g., a direction of the user's head, or a change in the user's orientation such as a turning of the torso or an about-face movement. In some example implementations, this position tracking system 352 can detect that user 225 has moved proximate a location 400 with a localized audio message 250, or that the user 225 is looking in the direction of a location 400 with a localized audio message 250. In particular example implementations, the position tracking system 352 can utilize one or more location systems and/or orientation systems to determine the location and/or orientation of the user 225, e.g., relying upon a GPS location system for general location information and an IR location system for more precise location information, while utilizing a head or body-tracking system to detect a direction of the user's viewpoint. In any case, position tracking system 352 can provide sensor data 230 to the location-based audio engine 210 about the position (e.g., location and/or orientation) of the user 225.

The accelerometer/gyroscope/magnetometer 354 can include distinct accelerometer components, gyroscope components, and magnetometer components, or could be collectively housed in a single sensor component. This component may be used to sense gestures based on movement of the user's body (e.g., head, torso, limbs) while the user is wearing the personal audio device 10 or interacting with another device (e.g., smart device 340) connected with personal audio device 10. As with any sensor in sensor system 36, accelerometer/gyroscope/magnetometer 354 may be housed within personal audio device 10 or in another device connected to the personal audio device 10. In some example implementations, the accelerometer/gyroscope/magnetometer 354 can detect an acceleration of the user 225 and/or personal audio device 10 or a deceleration of the user 225 and/or personal audio device 10. In addition, the accelerometer/gyroscope/magnetometer 354 can also be configured to detect the orientation of the user 225, e.g., a direction of the user's head, or a change in the user's orientation such as a turning of the torso or an about-face movement. In some example implementations, the accelerometer/gyroscope/magnetometer 354 can detect that user 225 has moved proximate a location 400 with a localized audio message 250, or that the user 225 is looking in the direction of a location 400 with a localized audio message 250.

The microphone 356 (which can include one or more microphones, or a microphone array) can have similar functionality as the microphone(s) 18 and 24 shown and described with respect to FIG. 2, and may be housed within personal audio device 10 or in another device connected to the personal audio device 10. As noted herein, microphone 356 may include or otherwise utilize microphones 18 and 24 to perform functions described herein. Microphone 356 can be positioned to receive ambient audio signals (e.g., audio signals proximate personal audio device 10). In some cases, these ambient audio signals include speech/voice input from user 225 to enable voice control functionality. In some other example implementations, the microphone 356 can detect the voice of user 225 and/or of other users proximate to or interacting with user 225. In particular implementations, location-based audio engine 210 is configured to analyze one or more voice commands from user 225 (via microphone 356), and modify the localized audio message 250 based upon that command. In some cases, the microphone 356 can permit the user 225 to record a localized audio message 250 for later playback by the user 225 or another user. In various particular implementations, the location-based audio engine 210 can permit the user 225 to record a localized audio message 250 to either include or exclude ambient sound (e.g., controlling ANR during recording), based upon the user preferences. In some examples, user 225 can provide a voice command to the location-based audio engine 210 via the microphone 356, e.g., to control playback of the localized audio message 250. In these cases, sensor data processing logic 270 can include logic for analyzing voice commands, including, e.g., natural language processing (NLP) logic or other similar logic.

Returning to sensor system 36, wireless transceiver 358 (comprising a transmitter and a receiver) can include, for example, a Bluetooth (BT) or Bluetooth Low Energy (BTLE) transceiver or other conventional transceiver device, and may be configured to communicate with other transceiver devices in distinct locations. In some example implementations, wireless transceiver 358 can be configured to detect an audio message (e.g., an audio message 250 such as an audio cache or pin) proximate personal audio device 10, e.g., in a local network at a geographic location or in a cloud storage system connected with the geographic location 400.

It is understood that any number of additional sensors 360 could be incorporated in sensor system 36, and could include temperature sensors or humidity sensors for detecting changes in weather within environments, optical/laser-based sensors and/or vision systems for tracking movement or speed, light sensors for detecting time of day, additional audio sensors (e.g., microphones) for detecting human or other user speech or ambient noise, etc.

As noted herein, sensor data 230 can include data about one or more location-based or environmental conditions detected by sensor system 36, and may include data about a plurality of environmental conditions. For example, sensor data 230 can include data about a position and/or orientation of the personal audio device 10 (e.g., from position tracking system 352), data about the direction the person audio device 10 is facing, data about an acceleration of personal audio device 10 (e.g., from accelerometer/gyroscope 354), data about the ambient audio conditions proximate personal audio device 10 (e.g., from microphone 356) or data about nearby audio, video or other data caches (e.g., from wireless transceiver 358).

Returning to FIG. 3, in various implementations, sensor data processing logic 270 is configured to process the sensor data 230 and provide a weighted localized representation to library lookup logic 280 to enable fetching a type of audio file 310 for providing in the localized audio message 250. That is, sensor data processing logic 270 can include weightings or factoring for one or more of user preferences (e.g., user profile(s) 330), sensor data about past events (e.g., position and/or acceleration information about personal audio device 10 over given periods), audio files (e.g., audio samples of user's voices, or audio signatures such as ambient audio signatures, as sampled by microphone 356), and other readily available data (e.g., a demographic profile of a plurality of users with at least one common attribute with the user 225 or a categorical popularity of an audio file 310). The weighted localized representation may indicate a general characteristic of the location, as a combination of factors from sensor data 230, profile(s) 330 and/or information from smart device 340.

After processing the sensor data 230 with sensor data processing logic 270, library lookup logic 280 can search audio library 300 for audio files 310 using the weighted localized representation from sensor data processing logic 270. Library lookup logic 280 may include a relational database with relationships between the weighted localized representation and audio files 310. As noted herein, audio library 300 can be locally stored at personal audio system 10, smart device 340, (FIG. 2) and/or stored at one or more remote or cloud-based servers. Library lookup logic 280 can be continually updated based upon changes in audio library 300 in order to provide accurate, timely associations between the weighted localized representation from sensor data processing logic 270 and audio files 310. In various implementations, as noted herein, the localized audio message 250 is selected based upon a proximity of the personal audio device 10 to a particular geographic location. The library lookup logic 280 can utilize the weighted localized representation to determine which, if any, localized audio message(s) 250 should be provided to the user 225 (e.g., via prompt 240 and related processes) according to the user profile 330 and/or proximity to geographic locations. For example, the library lookup logic 280 can be configured to select a localized audio message 250 from the audio files 310 when the user 225 is moving between multiple locations, as well as when the user 225 approaches a location, leaves a location, or turns toward or away from a location. Additionally, as discussed herein, library lookup logic 280 can be configured to select a beacon 255 to direct the user 225 to one or more localized audio message(s) 250 based upon the weighted localized representation.

FIG. 4 is a flow diagram illustrating process 800 for creating a localized audio message performed by the personal audio device 10, processor 530, and database 510 of system 500. The methods depicted in FIG. 4 can be performed by the systems depicted in FIG. 1, FIG. 2, and FIG. 3. At step 810, the processor 530 extracts a dataset 550 comprising information relating to the pre-determined subject from online media content 520. At step 820 the processor 530 generates one or more summaries 560 based on the information relating to a pre-determined subject. At optional step 830, a geographic location of the personal audio device 10 is determined from sensor data 230 of a sensor system 36 associated with the personal audio device 10. At optional step 840, an introduction to the localized audio message 250 is generated which is personalized to the user. At step 850, a localized audio message based on the one or more summaries is generated. At step 860, the localized audio message 250 is sent to a personal audio device 10 of a user 250.

The localized audio message 250 is sent to a personal audio device 10 based on a triggering factor 400 of the user 250. Multiple factors can trigger a localized audio message 250 to be sent to a personal audio device 10. Those factors can include environmental factors such as the time of day, geographic type (for example, the user 225 could be at an office park, a sporting venue, a greenspace, etc.) weather, and speed. For example, in the afternoon, a localized audio message 250 may be triggered relating to a restaurant for lunch. The localized audio message may differ based on the geographic type of the user 225. If the user 225 is in an office park, a localized audio message 250 for a restaurant may be triggered at lunch time, whereas if the user 225 is at a sporting venue, a localized audio message 250 relating to concessions may be triggered at any time. In cold weather, a localized audio message 250 indicating the proximity of a coffee shop may be triggered, and in warm weather, a localized audio message 250 indicating the proximity of an ice cream shop may be triggered. If it is determined that the user 225 is moving quickly, for example, if the user is driving in an automobile, a request for a localized audio message 250 may be triggered relating to a restaurant further away from the user 225. Whereas, if is determined that the user 225 is moving slowly, for example, if the user 225 is walking, localized audio messages 250 for restaurants that are nearby may be triggered. Additionally, from various environmental factors, an inference can be made about what a user 225 is doing. Depending on the user's 225 activity type, different localized audio messages 250 may be triggered. For example, a user 225 located at a sporting venue who is traveling at a high speed may be driving through and past the sporting venue. Whereas, a user 225 who is stationary, or moving at a slow speed, at the sporting venue may be attending the sports game, and a localized audio message 250 relating to concessions available at the sports game may be triggered. Any other environmental factors may trigger a localized audio message 250 regarding a number of subjects. For example, a celestial event such as a super blood wolf moon or a meteor shower may trigger a localized audio message 250 regarding the history and science relating to those events.

Other factors that can trigger a localized audio message 250 can relate to demographic information. For example, a localized audio message 250 may be triggered based on demographic traits of a user 225, such as age, where marketing information or usage information showing a pattern among groups of similar users indicates that the user 225 may be interested in the subject of the localized audio message 250. A localized audio message 250 may be triggered based on the proximity of the user 225 to a location. How close a user must be to the location to trigger the localized audio message 250, a proximity radius, can depend on many factors including, for example, the population density of the geographic region or the density of localized audio messages in the region. The population density of the geographic region and the density of localized audio messages may be taken into account in determining the proximity radius to avoid over-stimulation from prompts 240 in a region with a high density of localized audio messages 250, or to avoid a message "desert," where localized audio messages 250 are separated by significant distances.

Other factors that may trigger that a localized audio message 250 is sent include the availability of new media, including newly released audio books or newly released songs, or breaking news. A localized audio message 250 can be triggered based on whether the personal audio device 10 is being used for pin-to-pin conditionality, such as when playing chose your own adventure games such as Zombie Runs, scavenger hunts, or participating in tours. For example, a user could specify an interest in sequential localized audio message 250 that constitute, for example, a scavenger hunt, an expedition, or a story, and the prioritization engine 285 can be configured to prioritize localized audio message 250 from such a sequence, particularly if a localized audio message 250 from such a sequence has already been delivered to the user. Additional description of the directional audio selection engine can be found in U.S. application Ser. No. 15/908,183, titled "Directional Audio Selection," and filed on Feb. 28, 2018, which is incorporated herein by reference in its entirety. In some implementations, a user may specify preferences for receiving localized audio message 250 by a particular content generator. For example, user-preferences corresponding to the particular user can specify that the user is interested in a particular retail chain or a particular singer, and the prioritization engine 285 can be configured to prioritize content from such content providers. In some implementations, previous usage of localized audio messages is a triggering factor. For example, a user could "follow" or subscribe to the content generated by a particular content generator, and the prioritization engine 285 can be configured to alert the user to the availability of content from the particular content generator if the user enters a geographic area where such content is available.

Other factors that may trigger a localized audio message 250 include the user's social media connections (for example, triggered by a user's question "have any of my friends eaten nearby"); proximity to other user devices (e.g., requires multiple users within an area to activate); and peer-to-peer communication for social interactions such as gaming; and use of noise cancellation control (for example, a user may place the audio device in a "mute mode" such that no localized audio message 250 are delivered when that mode is active).

Localized audio messages 250 can be sent from system 500 at various times to the personal audio device 10. The localized audio messages 250 which are generated using method 800 can be sent to a personal audio device 10 continuously, at set intervals of time, in advance in bulk, or when prompted by the personal audio device. For example, the personal audio device 10 may request localized audio messages 250 as a user 225 is moving along a street and the user's proximity to restaurants, which are the topic of localized audio messages 250, increases. The localized audio messages 250 can also be generated by system 500 at various times. The localized audio messages 250 can be generated continuously. As an example, the localized audio messages can be generated continuously as changes to triggering factors are ongoing when prompted by a personal audio device 10, such as when a user 225 is walking along a street and entering close proximity to successive restaurants. The localized audio messages 250 can also be generated at various intervals of time, either fixed or variable. The localized audio messages 250 can also be generated by method 800 in advance and stored in database 510 or the personal audio device 10, for example in audio library 300. As an example, if a user profile 330 indicates that the user 225 has an interest in a certain topic, such as Japanese food, localized audio messages 250 regarding Japanese food can be generated and stored in advance of the user 225 being in proximity to a Japanese restaurant. For example, a number of localized audio messages 250 relating to Japanese restaurants or Japanese food can be generated using method 800 and a subset of localized audio messages 250 can be sent to the audio library 300 of a user's personal audio device 10. The subset can be selected, for example, based on additional information related to the user 225, such as the user's location, the user's demographic information, other user interests and preferences, etc. This way the time required for a user 225 to receive a localized audio message 250 can be reduced.

Information related to the pre-determined subject may be taken from pre-determined online media sources. For example, information related to reviews for a pre-determined restaurant may be taken from select, pre-determined online media content, such as tripadvisor.com, yelp.com, eater.com, zagat.com, etc. In another example, information related to the pre-determined subject may be taken from any online media sources. For example, information related to reviews of a pre-determined restaurant maybe taken from any website, including websites which compile restaurant reviews, blogposts, newspaper reviews, social media, or any other online content, including any newly created online content which contains information regarding the restaurant. As another example, the information related to the pre-determined subject may come from one or more online media users. For example, the information related to a pre-determined restaurant may come from social media users, for example, social media users using Twitter.com or a similar social media platform, to provide information regarding their restaurant experience. The online media users may also be solicited to provide the information from which the dataset is extracted. The pre-determined subject can relate to any topic. The identity of the pre-determined subject can be known to database 510 in system 500 for generating localized audio messages 250, or the identity of the pre-determined subject may be conveyed from the personal audio device 10 to processor 530, memory 532, and/or database 510 via communication interface 536. The identity of the pre-determined topic may be known in advance to the generation of localized audio messages 250 related to that topic, or the pre-determined topic may be conveyed to the processor 530 to request the generation of real time localized audio messages 250 which are generated on demand dynamically.

The one or more summaries 560 are created using the information compiled about a pre-determined subject and by creating a shorter text which reflects the information gathered by compiling the information from online media sources. The shorter text may include the most relevant information about the subject, the most unique information about the subject, or the most commonly provided information about the subject. The summaries may be generated using extractive summarization. When using extractive summarization, language or text that was used in the online media sources is utilized to create the shorter text regarding the subject. An example of a summary generated using extractive summarization is provided in Table 1.

TABLE 1

Extractive Summarization

Content From Online Sources
"High quality Italian cold cuts, cheeses, olives, canned goods, olive oils and balsamic vinegars-instantly transports you to Rome! Great staff and they may even give you a taste if you ask."
"The silkiest, best-tasting, not too salty prosciutto I have ever had. They make fresh sandwiches (didn't have time to try one though) and they sell authentic (from Italy) real olive oil (with dates) and Balsamic vinegar from Modena (that contains only two ingredients)!"
"Great little market. We bought a variety of cold cuts and cheeses, but the balsamic vinegar is outstanding. Try it."
"The Salumeria stocks every imaginable Italian delicacy including prosciutto and dozens of cheeses. Plus a huge selection of olive oils, balsamic vinegars and other hard to find Italian imports. They sell in such high volume that every hand cut item is as fresh as can be. The knowledgeable staff are extraordinarily friendly. Ask for a taste of something you are interested in and they will happily give you a slice. When in Boston's North End, do not miss this place."
Generated Summary
"High quality Italian cold cuts, cheeses, olives, canned goods, olive oils and balsamic vinegars-instantly transport you to Rome."

Examples of extractive summarization techniques include methods such as LexRank, SumBasic (with or without dynamic programming), and centroid-based summarization (with or without dynamic programming. Other techniques include methods included in the publicly available online packages such as Gensim or PyTeaser. The title of content may also be used as a summary of that content. As another example, abstractive summarization may be used to create the one or more summaries using information compiled about a subject. When using abstractive summarization, new language is created from the text that was used by the online media sources. For example, novel sentences may be created from words which were used by the online media sources.

A localized audio message 250 is generated using one or more summaries 560. As an example, the localized audio message 250 can be generated using natural language processing techniques from the one or more summaries 560. Artificial intelligence, machine learning, statistical inference, or other natural language processing techniques can be used to generate text for a localized audio message 250. As another example, the localized audio message 250 can be created using a pre-determined template language structure. For example, there may be a pre-determined template language structure for a localized audio message 250 which suggests a restaurant near a user. The pre-determined template language structure can include preselected language and space for language to be inserted, where the language to be inserted would be selected from the one or more summaries that were created. An example of pre-determined template language structure follows: "Have you tried _____ [insert restaurant name]. It is _____ [insert distance in miles] away from here. Online reviews describe the restaurant as _____ [insert description of restaurant]." As another example, probabilistic context-free grammars can be used to generate highly variable, high quality speech for the localized audio message 250. Using probabilistic context-free grammars, a single sentence from the one or more summaries may be converted into hundreds of unique variations. The language from the single sentence is framed using additional language or form language to generate variations of the single sentence. As an example, the sentence "At Salumeria Italiana, you can expect excellent Italian fare." can be converted into numerous variations, including: "Let me see, how about this. It's an Italian restaurant called Salumeria Italiana. I've heard it's awesome." or "Oh, I bet you will like this Italian restaurant called Salumeria Italiana. People say it's fantastic." or "Ooh, how about Salumeria Italiana. They serve Italian food and I've read that it's great."

As another example, the localized audio message 250 is generated to be personalized to the user. As an example, the text used to create language variation when generating an introduction to the localized audio message 250 may be selected based on demographic information regarding the user, his/her location, his/her use of the audio device, time of day, geographic location, etc. For example, the language to introduce and describe a restaurant may include language that is more frequently used in a particular region. Depending on the geographic location of the user, certain language could be chosen over other language. For example, a localized audio message regarding a particular restaurant may be introduced to the user with the following language: "Do you want to try an amazing new restaurant?" or "Do you want to try a rad new restaurant?" Other contextual information regarding the user which can influence the language selected can include the user's age or the user's interests. If a user has indicated an interest in a particular subject, this can be factored into the language used to generate a localized audio message.

Additionally, as an example, the localized audio message 250 can be generated using summaries 560 that are selected based on information that is contextual to the user. For example, based on a user's age, location, the weather, a pattern of usage of similar users in that location, and the user's usage history indicating an interest in tea, the system could select a summary regarding a tea shop rather than a coffee shop for the localized audio message 250.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A computer-implemented method for creating a localized audio message, comprising:
    extracting, by one or more processors, a dataset comprising preexisting language relating to a topic of interest from online media content;
    generating, by the one or more processors, one or more language summaries based on the preexisting language relating to the topic of interest, wherein the one or more language summaries are generated by summarizing the preexisting language relating to the topic of interest using extractive summarization and abstractive summarization, and wherein extractive summarization requires use of the preexisting language from the online media content and abstractive summarization requires use of new language based on the preexisting language from the online media content;
    generating, by the one or more processors, a localized audio message based on the one or more language summaries; and
    sending, by the one or more processors, the localized audio message to a personal audio device of a user, wherein the audio message is sent based on one or more triggering factors.

2. The method of claim 1, wherein the one or more triggering factors include: time, location of the personal audio device or user, geographic type, weather, demographic information, speed, pin-to-pin conditionality, social media connections, proximity to other user devices, celestial events, newly available media and news, previous usage of localized audio messages, use of noise cancellation control, peer-to peer communication, or usage patterns.

3. The method of claim 1, further comprising the step of determining a geographic location of the personal audio device from sensor data of a sensor system associated with the personal audio device.

4. The method of claim 3, wherein the sensor system associated with the personal audio device comprises: a position tracking system, a global positioning system, an orientation tracking system, an accelerometer, a magnetometer, or a gyroscope.

5. The method of claim 1, wherein the localized audio message is generated using summaries that are selected based on information that is contextual to the user.

6. The method of claim 1, wherein the localized audio message is generated using natural language processing.

7. The method of claim 1, further comprising the step of generating an introduction to the localized audio message which is personalized to the user.

8. The method of claim 1, wherein the localized audio message is generated by using a pre-determined template language structure including preselected language and at least one space for language to be inserted from the one or more language summaries generated.

9. The method of claim 1, wherein the localized audio message is generated using probabilistic context-free grammars.

10. The method of claim 1, wherein the preexisting language relating to the topic of interest from online media content is selected from pre-determined online media sources.

11. The method of claim 1, wherein the preexisting language relating to the topic of interest from online media content is generated by one or more online media users.

12. A system for creating a localized audio message, comprising:
a database comprising preexisting language relating to a topic of interest obtained from online media content;
one or more processors configured to:
(1) extract a dataset comprising the preexisting language relating to the topic of interest from the online media content; (2) generate one or more language summaries of the preexisting language relating to the topic of interest by summarizing the preexisting language relating to the topic of interest using extractive summarization and abstractive summarization, wherein extractive summarization requires use of the preexisting language from the online media content and abstractive summarization requires use of new language based on the preexisting language from the online media content; (3) generate a localized audio message based on the one or more language summaries; and (4) send the localized audio message to a personal audio device of a user; and
the personal audio device configured to receive the localized audio message based on one or more triggering factors.

13. The system of claim 12, wherein the one or more triggering factors include:
time, location of the personal audio device or user, geographic type, weather, demographic information, speed, pin-to-pin conditionality, social media connections, proximity to other user devices, celestial events, newly available media and news, previous usage of localized audio messages, use of noise cancellation control, peer-to peer communication, or usage patterns.

14. The system of claim 12, further comprising a sensor system associated with the personal audio device, the sensor system configured to generate sensor data, wherein a geographic location of the user can be determined based on the sensor data from the sensor system.

15. The system of claim 14, wherein the sensor system associated with the personal audio device comprises: a position tracking system, a global positioning system, an orientation tracking system, an accelerometer, magnetometer, or a gyroscope.

16. The system of claim 12, wherein the localized audio message is generated using summaries that are selected based on information that is contextual to the user.

17. The system of claim 12, wherein the localized audio message is generated using natural language processing.

18. The system of claim 12, wherein the localized audio message is generated by using a pre-determined template language structure including preselected language and at least one space for language to be inserted from the one or more language summaries generated.

19. The system of claim 12, wherein the localized audio message is generated using probabilistic context-free grammars.

20. The system of claim 12, wherein the preexisting language relating to the topic of interest from online media content is selected from pre-determined online media sources.

21. The system of claim 12, wherein the preexisting language relating to the topic of interest from online media content is generated by one or more online media users.

* * * * *